(12) United States Patent
Roche

(10) Patent No.: US 8,502,730 B2
(45) Date of Patent: Aug. 6, 2013

(54) METHOD FOR DETECTING A BIRD OR A FLYING OBJECT

(76) Inventor: Henri-Pierre Roche, Beziers (FR)

( * ) Notice: Subject to any disclaimer, the term of this patent is extended or adjusted under 35 U.S.C. 154(b) by 199 days.

(21) Appl. No.: 13/140,095

(22) PCT Filed: Dec. 16, 2009

(86) PCT No.: PCT/FR2009/052566
§ 371 (c)(1),
(2), (4) Date: Jul. 14, 2011

(87) PCT Pub. No.: WO2010/076500
PCT Pub. Date: Jul. 8, 2010

(65) Prior Publication Data
US 2011/0260907 A1 Oct. 27, 2011

(30) Foreign Application Priority Data

Dec. 16, 2008 (FR) ...................................... 08 07080
Mar. 3, 2009 (FR) ...................................... 09 51329

(51) Int. Cl.
*G01S 13/56* (2006.01)
(52) U.S. Cl.
USPC ............ 342/61; 342/26 R; 342/26 D; 342/59; 342/27
(58) Field of Classification Search
USPC ................ 342/61, 27–28, 26 R, 26 D, 29, 59, 342/159
See application file for complete search history.

(56) References Cited

U.S. PATENT DOCUMENTS

| 7,876,260 B2 * | 1/2011 | Laufer .............................. 342/61 |
| 2002/0140597 A1 | 10/2002 | Taylor et al. |
| 2008/0260531 A1 | 10/2008 | Stommel |
| 2010/0265122 A1 * | 10/2010 | Oswald ........................ 342/136 |
| 2011/0241928 A1 * | 10/2011 | Oswald et al. ................. 342/90 |
| 2011/0260907 A1 * | 10/2011 | Roche ............................ 342/27 |
| 2011/0260908 A1 * | 10/2011 | New et al. ...................... 342/59 |
| 2011/0285581 A1 * | 11/2011 | Hol et al. .................... 342/25 F |
| 2012/0105272 A1 * | 5/2012 | Moruzzis et al. ............. 342/159 |

FOREIGN PATENT DOCUMENTS

| DE | 20 2004 006 595 U1 | 8/2004 |
| DE | 10 2005 046 860 A1 | 4/2007 |
| DE | 10 2007 004 027 A1 | 7/2008 |
| DE | 10 2007 025 314 A1 | 12/2008 |

(Continued)

OTHER PUBLICATIONS

Desholm, M. et al., "Remote techniques for counting and estimating the number of bird-wind turbine collisions at sea: a review", British Ornithologists' Union, IBIS, Jan. 2006, pp. 76-89, vol. 148, Wiley-Blackwell Publishing Ltd., Great Britain.

*Primary Examiner* — John B Sotomayor
(74) *Attorney, Agent, or Firm* — Laurence A. Greenberg; Werner H. Stemer; Ralph E. Locher

(57) ABSTRACT

A method detects a bird or an object flying level with a single wind turbine, using a device for radio wave detection of at least one bird or another flying object, in the form of at least one radar. The analog image from each radar is transformed into a digital image and an outer safety area and an inner safety area is defined for the image. A safety space for each radar is defined and an action is performed in the event of a detection within the safety areas.

10 Claims, 1 Drawing Sheet

FOREIGN PATENT DOCUMENTS

| | | | |
|---|---|---|---|
| FR | 2939902 A1 * | 6/2010 | |
| FR | 2948194 A1 * | 1/2011 | |
| FR | 2948198 A1 * | 1/2011 | |
| JP | 2008096103 A * | 4/2008 | |

* cited by examiner

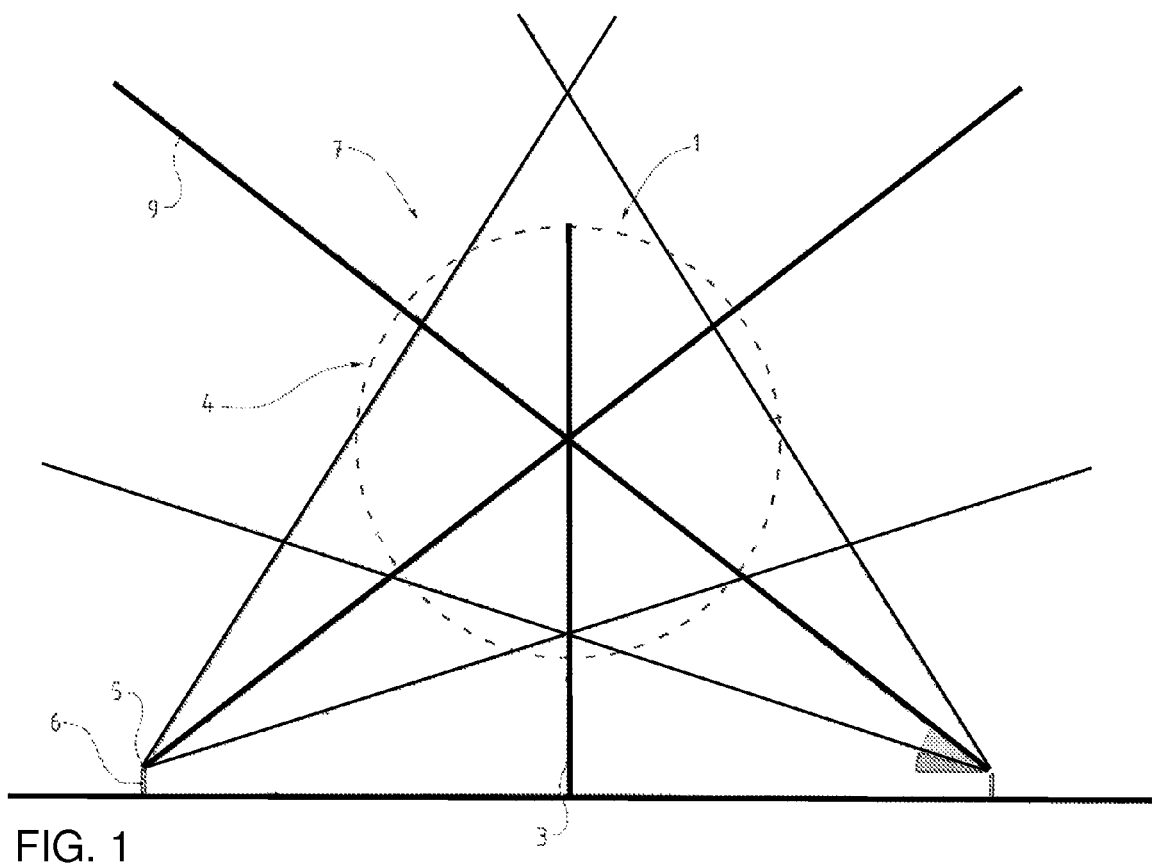
FIG. 1
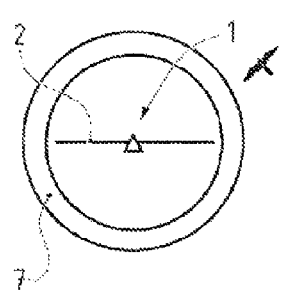 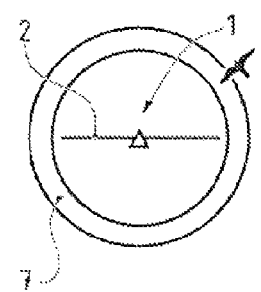 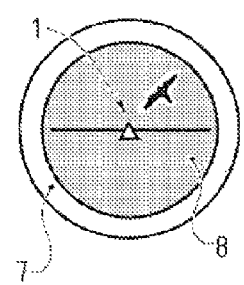
FIG. 2  FIG. 3  FIG. 4

METHOD FOR DETECTING A BIRD OR A FLYING OBJECT

BACKGROUND OF THE INVENTION

Field of the Invention

The present invention relates to the ornithological field, in the context of preserving species of birds or other flying animals in the vicinity of an industrial site.

The invention will find a particular application in the detection of a bird within an energy-producing wind farm and in preventing birds colliding with the moving blades of the electricity-producing industrial wind turbines.

Industrial wind turbines are the cause of considerable bird death by collision of birds with the blades, more precisely at the blade's free extremity. The Ligue pour la Protection des Oiseaux (LPO) (league for the protection of birds) believes in this respect that deaths reach from 0.01 to 36 birds per wind farm and per year, for all species.

For the very large majority of the small bird species (for example the family of sparrows or of apodal birds, such as the swift) which may collide with the blades of the wind turbines, the size of their population makes this mortality rate negligible compared with other causes of death: road traffic, electric and overhead lines, and predators, notably domestic animals (cat, dog, etc.).

The situation is however different with respect to the large-sized species such as birds of prey (eagles, vultures, kites or similar birds) or of other long-flight birds (storks or other birds). Specifically, these species have low populations with low reproduction rate. Consequently, the additional mortality associated with wind turbines then becomes significant for these species and its reduction is a real issue, all the more so since these species are rare and endangered and are the subject of national and international protection commitments.

An analysis of the research conducted on the cases of mortality of heritage bird species by collision with wind turbines shows first of all that the geographic distribution of the cases of mortality covers many global locations: northern Europe (white-tailed eagle), Germany (red kite), Scotland (golden eagles), Spain (griffon vulture, Egyptian vulture, white stork, black stork), United States of America (golden eagles), Australia (wedge-tailed eagle), France (white stork) and Japan (sea eagle).

Moreover, these species show great confidence in the face of rotating wind turbines (vultures and kites). They can fly into the space swept by the blades both in good weather conditions and in poor visibility, as do the eagles in Scotland. Certain species (red kite, golden eagle, white-tailed eagle) even actively frequent the wind farms in order to feed off the cadavers of other birds that have collided with the blades.

Moreover, the risks of collision are higher on the main axes of movement usually exhibiting particular geographical features: relief, exposure, wind conditions. These particular features are sought by the birds because they make it easier for them to move from place to place, forming zones for thermal ascent or for orographic ascent. The risks of collision also increase considerably close to feeding or reproduction sites where there is a high concentration of birds.

It will be noted that the collisions occur most frequently between the distal portion of the blades and the bodily extremities of the birds (head, tail and at the end of the wing). Consequently, an assumption made is that the closer the birds are to the wind turbines, the less they anticipate the rotation speed of the blades, the end of the latter being able to reach speeds of up to 200 km/h.

The magnitude of these mortalities on species considered to be heritage species constitutes a considerable obstacle to the development and the exploitation of wind farms, having already been the cause of temporary or definitive stoppages of machines in the United States (Altamont Pass, Calif.) and in Spain, a permanent watch on the wind farms by ornithologists (Australia) and also a cancellation of installation projects (Germany). These stoppages and the disputes accompanying them are threatening the financial investments associated with the development of renewable wind energy, from the point of view both of development and the exploitation of the wind farms.

A solution consisting in adapting the design of the wind turbines and their installation in sites that are home to rare species is still not very fruitful, on the one hand because of the theoretical foundations that are hesitant with regard to the determinism and the operation of the movements of the birds and, on the other hand, because these movements over time and space retain substantial randomness associated with the dynamics specific to the species and the individuals.

In order to reconcile the development of wind energy and the conservation of biodiversity, detection methods and devices have been developed making it possible to stop the wind turbines if there is an imminent risk of collision with a heritage species.

The most effective systems include means for detecting and estimating distance by radiowaves, namely radars (for "RAdio Detection And Ranging"), in order to monitor the wind farms. Moreover, radar detection has already been widely used by ornithologists in order to study bird movements, notably at the time of migrations.

It will be noted that radars are usually used for detecting and measuring distances of objects in space by transmitting and receiving microwave electromagnetic waves. The execution modalities and the practical applications are currently extremely varied, but the most widely used and the most financially affordable devices are currently radars of the "marine" type. The latter are usually rotating radars, with X-band, S-band or L-band pulsing, with beam angle height of approximately 20°. They are usually used in the horizontal plane, namely the median of the vertical angle of the transmission beam is parallel with the horizon.

In practice, the objects detected in the transmission beam of the radar waves are projected onto the median of the vertical angle of said transmission beam. Said detected objects are then represented in the form of one or more echoes in a two-dimensional plane.

A major drawback of this detection method lies in the fact that the further the object is from the radar wave transmission source, the less reliable is its detection. Specifically, the greater the distance between the object and said source, the more the resulting echo is imprecise in terms of dimensions and position.

As explained above, such radars have already been used for the detection of birds in flight. Three detection methods are mainly used in the ornithological context by means of a single radar.

A first method positions the median of the vertical angle of the radar beam on a plane parallel with the horizon. By using the "trail" function of radars, it is possible to map the trajectory of the birds on a horizontal plane in two dimensions. This technique however does not make it possible to ascertain the altitude of the birds in flight.

A second method positions the median of the vertical angle of the radar beam on a plane perpendicular to the horizon. It is then possible to determine the altitude of the birds relative to the ground, but not to ascertain their trajectories.

Finally, the last method positions the median of the vertical angle of the radar beam in an inclined manner, at a variable angle, usually 45° relative to the horizon. Theoretically, this positioning makes it possible to indicate the altitudes and the direction of movement of the birds. In practice, it is however little used because it requires a mathematical processing of the data in order to determine the altitude. Moreover, the detection space is more limited than for the other two detection methods.

Other systems combine two radars, one in the vertical position, the other in the horizontal position. These systems, used at airports in preventing the risk of birds colliding with the aircraft, make it possible to ascertain, for a given space, the altitudes and the trajectories of the birds. However, they do not make it possible to specifically determine the altitude of each of the recorded trajectories and vice versa.

This being so, the main objective of the ornithological studies using radars is to detect the smallest possible species as far away as possible. To do this, the radars used are now mainly of high power (several hundreds of kilowatts, with antennas of more than a meter in length). Such radars are complex, requiring the virtually permanent presence of technicians, and costly. Therefore, they are often designed to be mobile in order to regularly change location.

Other detection systems are more sophisticated, such as for example Doppler radars or tracking radars ("Tracking Radar Systems"). They can be used in the detection of birds but hitherto have not found any practical application in this field, because of their cost, their high technicity and their limitations of use. Specifically, tracking radar systems, although they can follow a flying object moving in an empty space, are however scrambled by the moving blades when the object is close to a wind turbine.

The abovementioned techniques and devices are used for detection close to one or more wind turbines, on land and at sea. However, it is in this latter maritime context that their installation is most widespread. Specifically, on land, the detection capacity of marine radars with a long range in the horizontal plane, from several hundred meters to several kilometers, is greatly limited by the shadow zones created by solid obstacles: ground, relief, trees or buildings.

This drawback finds a solution through document US 2002/0140597 which proposes the detection of an object moving through an opaque and fixed visual barrier. To do this, a network of several nonrotating, monostatic radar antennas is installed and the detection data thus measured are processed on a computer.

Such a system is however not suitable for detection close to a wind turbine. This is because, on the one hand, the blades of the wind turbines are objects that can move simultaneously in the horizontal and vertical planes and cannot be considered static barriers in space. Therefore, such a system cannot avoid detecting said blades and cannot distinguish them from other objects that may be moving. Moreover, the angles of detection do not cover the whole field swept by the blades of an industrial wind turbine.

Consequently, the problem arises of detecting with sufficient accuracy the position of said bird or flying object close to the wind turbine in order to justify a sufficient risk of collision with the blades, such that it requires the detection to automatically induce a braking and/or a stoppage of the movement of said blades. This detection must therefore be carried out in a three-dimensional space, at most at a few meters from the sphere potentially swept by the blades, irrespective of the wind direction and therefore the position of rotation of said blades.

Although the systems for detecting birds by radar as described above are widely used for studying the movement of birds, or any other flying object, they do not have the sufficient and necessary features to meet this objective at an affordable and bearable cost. This is because such systems suffer, on the one hand, from their inability to faithfully position one and the same object in three dimensions close to another moving object such as a wind turbine, on the other hand, from the physical contingencies of the radar waves the detection accuracy of which decreases with distance and, furthermore, from the environmental contingencies (physical obstacles and reliefs).

A solution has however been devised for the purpose of detecting a flying object close to a wind turbine, the blades of which are in motion, in order to control a slowing or a total stoppage of the wind turbine in order to prevent the collision of said object, when it is sufficiently close, i.e. at most at a few tens of meters from said blades. Such a solution is described through document DE 10 2005 046860 which proposes the detection of flying objects, in particular bats, by the use of ultrasound detectors attached to the nacelle on the turbine of said wind turbine, on the mast or on the blades at a determined distance from the center of rotation of said blades.

However, since birds emit little or no ultrasounds, detecting them is greatly limited thereby. Even though this document envisages using radars instead of ultrasound detectors, it in no way specifies how they work and the features of such a detection system.

Other techniques for detecting an object in flight close to wind turbines use infrared detectors or thermal cameras. In the prior art, these systems however make it possible only to record movements of birds close to wind turbines and not to anticipate the collision of the birds with the blades. Moreover, these systems also have detection fields smaller than the totality of the space swept by the blades of one and the same wind turbine. Even combined with a system for stopping the wind turbines, they can therefore not effectively prevent collisions.

Finally, there are impact noise detection systems for detecting objects flying against the wind turbines. By nature, however, these systems record the collisions but cannot prevent them.

Likewise there is no system making it possible to control the restarting of said wind turbine after said bird or flying object has moved sufficiently far from said wind turbine. The difficulties of application of the radars in this context are such that, in certain wind farms, in Australia in particular, ornithologists visually and continuously monitor the movement of certain species that are rare and threatened with extinction, in order to manually control the starting and stopping of the wind turbines, thus preventing deaths by collision.

BRIEF SUMMARY OF THE INVENTION

The known detection devices therefore do not give full satisfaction. The object of the invention is to alleviate the drawbacks of the prior art by proposing an appropriate, standardized and automated detection and control system the implementation costs of which remain affordable and bearable in the context of the exploitation of an industrial wind turbine. The invention also provides the advantage of detection of birds of variable size and morphology irrespective of the weather conditions, both during the day and at night.

Contrary to the methods currently used, the object of the invention is to monitor only the immediate surroundings of a single wind turbine and of the risk zone formed by the volume swept by the blades of said wind turbine, namely the volume of a sphere centered around the turbine. This sphere represents the circle of rotation of the distal ends of the blades of said wind turbine, said circle being set to revolve about the vertical rotation axis of said turbine.

To do this, the invention first of all proposes to detect the movement of an object entering the immediate vicinity of a single wind turbine by creating, in the absence of said object, a reference computer image of said surroundings and by analyzing the change of state of this reference image after the object has entered the monitoring space.

The invention proposes that the same approach be applied to the risk zone corresponding to the sphere swept by the rotating blades. "Surroundings" and "risk zone" are therefore understood to be two particular and complementary zones of the total detection area of the radar.

Moreover, detection within the meaning of the invention envisages a two-dimensional safety zone having a three-dimensional resultant. Specifically, the creation of a safety zone on a two-dimensional radar image is a conventional function of radars. The detection of an object or of a movement in said safety zone then causes an action, usually an alarm. The abovementioned systems use only the detection properties for detecting the safety zone in the two-dimensional image. In other words, no system explicitly and specifically uses the reverse capability, namely that the safety zone created in two dimensions makes it possible to theoretically define a three-dimensional volume when the horizontal and vertical angles of the wave beam transmitted by the radar are known. The limits of this volume are then the projection, perpendicularly to the median of the vertical angle of the wave beam transmitted by the radar, of the two-dimensional limits defined on this same median, onto the three-dimensional outer limits of the same beam.

The object of the present invention is therefore to define a standardized and automated technical device based on the technology of the widely used radars of the "marine" type making it possible to detect with sufficient and necessary accuracy, while having an affordable and bearable cost in the context of the exploitation of a land-based industrial wind turbine, at least one bird in flight or any other flying object moving in the air space, irrespective of its position in said space, sufficiently close, namely a few meters, to the moving blades of an industrial wind turbine, irrespective of the dimensions of said wind turbine and the position of said blades in the space. Moreover, the intention of the invention is to determine a detection such that the proximity of this bird or flying object constitutes a risk of collision of said bird or flying object with said blades, requiring the control of the braking or of the stopping of the movement of said blades, until said bird or flying object passes by and/or moves away.

Although small birds can be detected, the invention will find its main application in the detection of heritage species, more frequently of large size, the death of which has environmental impacts relating to the preservation of the heritage species. Moreover, technically, the means used by the present invention find their greatest tolerance of interference echoes in the context of detecting targets exceeding certain dimensions.

The invention also offers a commercial advantage in the exploitation of an industrial site for the production of wind energy.

Specifically, the detection according to the invention offers the advantage of having low cost, being fixed and therefore dedicated to the site on which it is installed, and being easy to install and maintain.

For this purpose, the invention relates to a method for detecting a bird level with a single wind turbine, in which radio-wave means are used for detecting at least one bird or other flying object, in the form of at least one radar, characterized in that it consists in:

inclining each radar on its horizontal axis so that the vertical height of the wave beam transmitted in the axis of said wind turbine by each radar covers all or part of a sphere formed by the theoretical sweeping volume of the rotating blades of the wind turbine;

converting the resultant two-dimensional analog image of each radar into an independent digital image for each radar;

applying to each digital image of each radar, on the one hand, an outer two-dimensional safety zone the center of which is positioned in the center of the sphere and the dimensions of which are greater than those of said sphere and, on the other hand, an inner safety zone with dimensions smaller than or equal to those of said sphere, creating a safety volume for each radar;

independently positioning each radar at a distance from the wind turbine so that the safety zones of each radar complement one another according to the overall safety zone formed by the sum of the respective safety zones of each radar;

taking an action when there is detection within one or other of said safety zones.

Other features and advantages of the invention will emerge from the following detailed description of nonlimiting embodiments of the invention, with reference to the appended figures in which:

BRIEF DESCRIPTION OF THE SEVERAL VIEWS OF THE DRAWING

FIG. 1 represents a schematic view in vertical section of the detection device according to the invention;

FIGS. 2 to 4 represent schematic views of successive steps of using the detection method according to the invention.

DESCRIPTION OF THE INVENTION

The present invention relates to a system for detecting a bird level with a wind turbine 1, and more particularly a method for detecting a bird or a flying object level with one and only one wind turbine 1.

In particular, this detection proposes to detect any intrusion of a bird within a monitoring space including a sphere 4 formed by the theoretical sweeping volume of the rotating blades of the wind turbine 1, and the approaches to such a sphere 4, and then to envisage an action, notably to intervene automatically on the operation of the wind turbine 1, in the event of intrusion.

It will be noted that the intervention may consist in a slowing and then, if necessary, a total stopping of the rotation of the blades of the wind turbine 1.

To do this, the invention proposes to use means for detecting at least one bird or other flying object by radio waves, in the form of at least one radar 5, notably two radars 5.

More particularly, said radars 5 may be of "marine" type, namely they are X-band, S-band or L-band rotating radars. Moreover, each radar 5 may advantageously have a vertical wavebeam height of at least 10 degrees, notably 20 degrees, a power of less than 10 kilowatts and an antenna that is less than 1 meter long.

Moreover, the invention proposes to incline each radar 5 on its horizontal axis so that the vertical height of the wave beam, transmitted in the axis of said wind turbine 1 by each radar 5, covers all or part of said sphere 4.

According to a preferred, but in no way limiting, embodiment, each radar 5 may be positioned at a height, on a pylon 6, in order to avoid the shadow created by objects moving on the ground and that have no risk of collision with the blades of said wind turbine 1, such as land vehicles. This elevation also makes it possible to obtain a coverage of the beam of each radar 5, without the ground, any unevenness in level or other obstacles forming a disruption to the detection.

It will be noted that the elevation of said radars 5 may consist in the installation on another wind turbine situated close by.

Finally, each radar 5 may be placed on the ground at an appropriate distance, depending on the height of its beam and the pulse length of the wave train, in order to detect targets situated in front of and beyond the wind turbine 1, and in front of and beyond the sphere 4 of rotation of its blades.

In the exemplary embodiment that can be seen in FIG. 1, note that a portion of said sphere 4, situated at the bottom close to the mast 3, is not covered by the radars 5. However, access to this location by a bird, or any other flying object, is limited to passing through the rest of the beams of the radars 5.

According to another feature, the adjustment of said radars 5 may consist in increasing the recurrence frequency and/or reducing the pulse length. In particular, the recurrence frequency is adjusted to the maximum in order to provide detection over short periods of time.

The sensitivity of the radars 5 may also be calibrated so as to detect only considerable targets, namely having given dimensions, such as large-sized birds such as the eagle, vulture, kite, stork or similar. This calibration also prevents interference echoes, such as rain, fog, snow, insects or small-sized birds.

Each radar 5 may be adjusted independently in order to be suited to the configuration of each wind turbine 1 installation.

As a nonlimiting example, in the case of a wind turbine 1 having a turbine height of 75 meters and a total height at the tip of the blade 2 of 120 meters, the radars 5 have a vertical beam height of 20 degrees, and are positioned at a distance of 90 meters from the base of the mast 3. Moreover, the radars 5 may be raised, installed at a height of 5 meters. Then, the median 9 of the vertical height of the beam makes an angle of approximately 19° with the horizontal.

Once this overall detection zone is determined, the invention proposes a processing of the analog images recorded by each radar 5.

Advantageously, the invention proposes to transform the resultant, two-dimensional analog image of each radar 5 into an independent digital image for each radar 5.

Then, to each digital image of each radar 5, is applied, on the one hand, an outer safety zone 7 and, on the other hand, an inner safety zone 8, creating a safety volume for each radar 5.

First of all, said outer safety zone 7 appears in two dimensions, notably in toroidal form, and the center of which is positioned on the center of the sphere 4. Its dimensions are greater than those of said sphere 4.

For its part, said inner safety zone 8 is centered in the same manner but has dimensions that are smaller than or equal to those of said sphere 4.

These safety zones 7 and 8 may advantageously be designed to be complementary, the inner perimeter of the outer zone 7 coinciding with the outer perimeter of the inner zone 8. In other words, each radar 5 is independently positioned at a distance from the wind turbine 1 so that the safety zones of each radar 5 complement one another according to the overall safety zone formed by the sum of the respective safety zones of each radar 5.

It will be noted that this overall safety zone may coincide with or be of lesser dimensions than the total space swept by said radars 5.

Thus, each radar 5 is calibrated so that the half-pulse length is less than or equal to the shortest distance between the radar 5 and the outer perimeter closest to the outer safety zone 7 defined for this same radar 5.

Then, the invention carries out an action, notably a command on the operation of said wind turbine 1 depending on the movements detected within one and then the other of the safety zones 7 and 8.

As specified above, the intervention on the operation of said wind turbine 1 may consist in totally stopping the turbine and then restarting it, and slowing the rotation of its blades 2, notably by braking, down to a safety speed allowing the birds to avoid the blades 2. Moreover, the duration of slowing or of stopping may be subject to the detection of the bird in one or the other zones, 7 or 8, in particular the slowing or stopping are maintained so long as a movement is detected therein. In brief, the restarting of the wind turbine 1 is controlled when no object is detected within the overall safety zone.

It will be noted that the invention makes it possible to ensure that the detected targets are indeed moving birds. To do this, said radars 5 may include the activation of a tracking function ("trail"), namely the detection of the trail of the echoes sensed by the radar 5. This trail is more likely than a simple point to be perceived by the movement-detection software.

Moreover, according to an additional operating mode, the detection method according to the invention consists in positioning two radars 5 in an opposed manner on a horizontal axis of symmetry passing through the foot of the mast 3 of said wind turbine 1.

Preferably, as can be seen in FIGS. 2 to 4, the method consists in creating a reference image of the outer safety zone 7 in the absence of an object (FIG. 2), and initiating the slowing or the stopping of the movement of the blades 2 of the wind turbine 1, when an object is detected in said outer safety zone 7, by virtue of a change of state of said reference image (FIG. 3). Then, when the desired safety speed or the stoppage of the wind turbine has been achieved, a reference image is created of the inner safety zone, and the slowing or the stoppage of said wind turbine 1 is maintained so long as a new object is detected in the inner safety zone 8 (FIG. 3) or so long as an object is detected in the outer safety zone 7, in both cases by virtue of the software for detecting movement by change of state of the corresponding reference image.

As mentioned above, depending on the detected movements or at the end of a determined period of time, with no detection of movement in one and/or the other of the inner 8 and outer 7 safety zones, a restart signal is sent to the wind turbine 1. Then the detection system returns to the initial detection state within the outer safety zone 7, according to FIG. 2.

According to other additional features, additions may be made to the detection according to the invention, notably by complementary measures, modifications of the features of the transmission and reception antennas of the radars 5, or else in the real-time computer processing of the safety zones 7 and 8.

In particular, the complementary measures may consist in programming the detection system according to different parameters: day/night, times, seasons, weather conditions, probability of presence of birds.

According to a particular embodiment, photographic and video recording means, such as a camera, may be controlled so as to be triggered when a bird is detected and make it possible to record the bird passing through the risk zone for a subsequent inspection, or even an identification.

Moreover, the modifications to the features of the antenna may consist in increasing the vertical height of the beam of each radar 5, making it possible to bring the radar 5 closer to the wind turbine 1. Although this nearing has the drawback of reducing the accuracy of detection, it reduces the lengths and costs of installation, notably associated with the wiring.

As mentioned above, this aspect may be combined with an increase in the recurrence frequency in order to increase the accuracy of the echoes.

Moreover, all or some of the transmitting rotary antennas of said radars 5 may be replaced by twin, fixed antennas the addition of the horizontal and vertical angles of which makes it possible to cover the entirety of the overall safety zone, limiting the maintenance associated with the mechanical wear of the rotary means, with or without merging of the images obtained for each transmitting antenna.

It is also possible to synchronize in an offset manner the pulses transmitted by the radars 5 in order to prevent the reflected interference echoes.

Finally, it may also be envisaged to transmit polarized waves, one polarization being dedicated to each radar 5, refining the quality of the received signal and reducing the interference echoes and the interference between the radars 5.

Another modification may lie in the automatic changing of the shape and the positioning of the safety zones, in particular the inner safety zone 8, depending on the position of the rotor of the wind turbine 1. To do this, it is possible to ascertain the position of said rotor depending on the operating conditions, notably the direction and the strength of the wind. The space swept by the blades is then no longer a sphere 4 but a ellipsoid of revolution.

The detection according to the invention can be adapted to any type of wind turbine 1 and according to their installation conditions, notably the relief, when their positioning makes it possible to adjust the distances between the radars 5 and the wind turbine 1, and their installation height.

The invention also makes it possible to detect all species, depending on their period of presence (nesting birds or migrating birds) and on the risk conditions that affect the programming of the activity of the system, depending on the period and climatic conditions and therefore the probability of presence of the species. The precise and adjustable sensitivity of the system also makes it possible to select the species depending on their dimensions.

Moreover, the invention is fixed, permanent and programmable depending on the probabilities of presence of the species to be protected.

Naturally, the invention is not limited to the examples illustrated and described above which may have variants and modifications without thereby departing from the context of the invention.

The invention claimed is:

1. A method for detecting a bird or a flying object level with a single wind turbine, in which radio-wave means are used for detecting at least one bird or other flying object, in the form of at least one radar, the method comprising the following steps:
    inclining each radar on its horizontal axis so that the vertical height of the wave beam transmitted in the axis of said wind turbine by each radar covers all or part of a sphere formed by the theoretical sweeping volume of the rotating blades of the wind turbine;
    converting the resultant two-dimensional analog image of each radar into an independent digital image for each radar;
    applying to each digital image of each radar, on the one hand, an outer two-dimensional safety zone the center of which is positioned in the center of the sphere and the dimensions of which are greater than those of said sphere and, on the other hand, an inner safety zone with dimensions smaller than or equal to those of said sphere, creating a safety volume for each radar;
    independently positioning each radar at a distance from the wind turbine so that the safety zones of each radar complement one another according to the overall safety zone formed by the sum of the respective safety zones of each radar; and
    taking an action when there is detection within one or other of said safety zones.

2. The detection method as claimed in claim 1, characterized in that it consists in positioning two radars in an opposed manner on a horizontal axis of symmetry passing through the foot of the mast of said wind turbine.

3. The detection method as claimed in claim 1, characterized in that it consists in positioning each radar at a height on a pylon.

4. The detection method as claimed in claim 1, characterized in that said action consists in:
    controlling the operation of said wind turbine, notably braking or stopping, depending on the movements detected within one and/or other of the safety zones when an object is detected in said safety zones; then
    controlling the restarting of the wind turbine when no object is detected within the overall safety zone.

5. The detection method as claimed in claim 1, characterized in that it consists in:
    creating a reference image of the outer safety zone in the absence of an object;
    initiating the slowing or the stopping of said wind turbine when an object is detected;
    when a safety speed or stopping of the movement of the wind turbine blades is achieved, creating a reference image of the inner safety zone,
    maintaining the stoppage of said wind turbine so long as a new object is detected in the inner safety zone; and
    keeping the wind turbine stopped so long as an object is detected in the outer safety zone.

6. The detection method as claimed in claim 1, characterized in that it consists in using for the radar a radar of the "marine" type, of the X-band, S-band or L-band rotary radar type, or else twin, fixed antennas.

7. The detection method as claimed in claim 1, characterized in that the adjustment of said radars consists in reducing the pulse length so that the half-pulse length of each radar is less than or equal to the shortest distance between said radar and the outer perimeter of the outer safety zone of said radar.

8. The detection method as claimed in claim 1, characterized in that it consists in taking additional measurements in the form of a programming of the detection system according to various parameters: day/night, times, seasons, weather conditions or probability of the presence of birds.

9. The detection method as claimed in claim 1, characterized in that it consists in automatically causing the shape and the positioning of said safety zones to change depending on the position of the rotor of said wind turbine.

10. The detection method as claimed in claim 1, characterized in that it consists in transmitting polarized waves.

* * * * *